Figure 1:
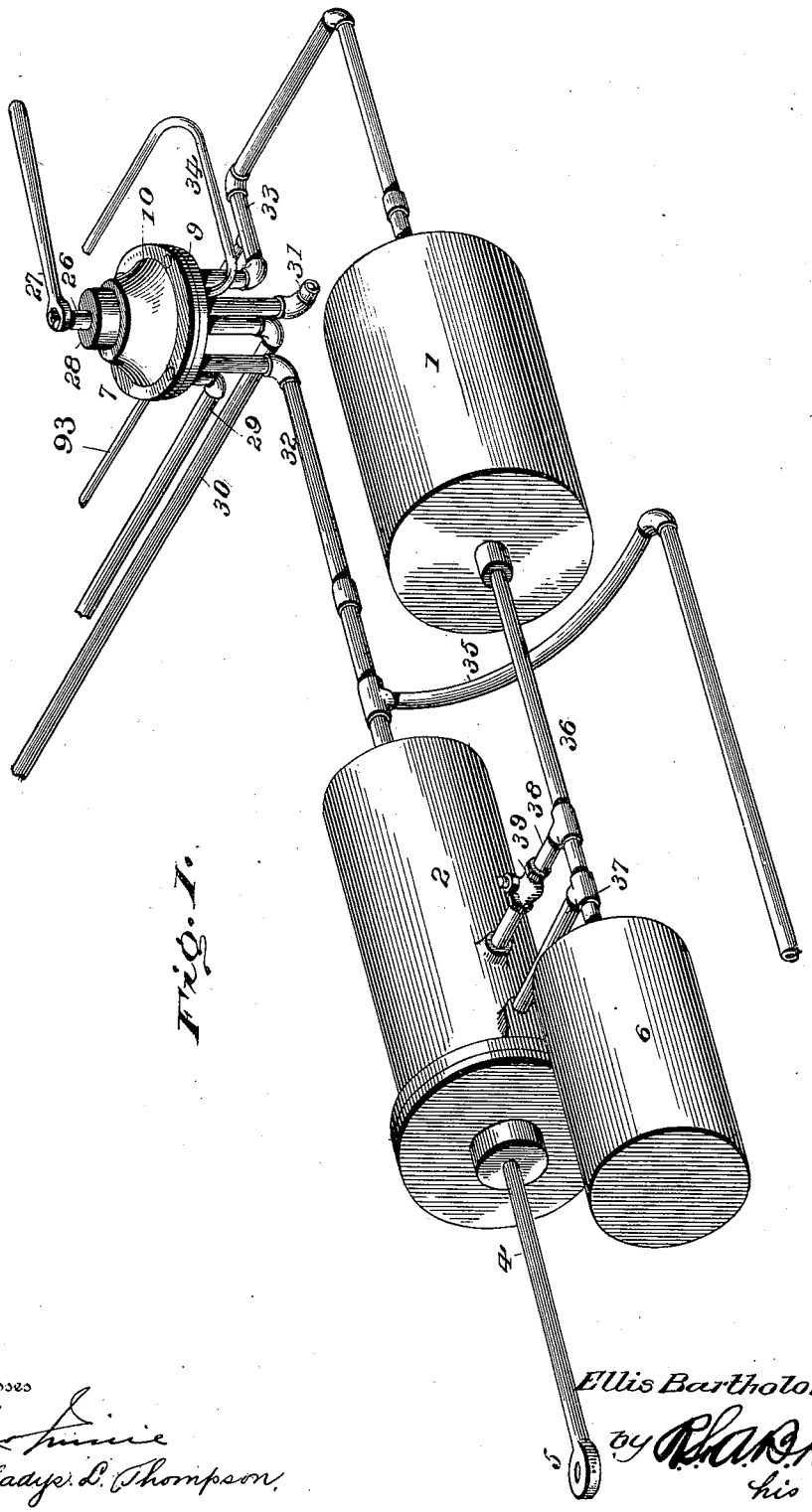

No. 629,708. Patented July 25, 1899.
E. BARTHOLOMEW.
AIR BRAKE.
(Application filed May 11, 1898.)

(No Model.) 11 Sheets—Sheet 1.

Witnesses

Inventor
Ellis Bartholomew
by R. A. D. Lacey.
his Attorneys

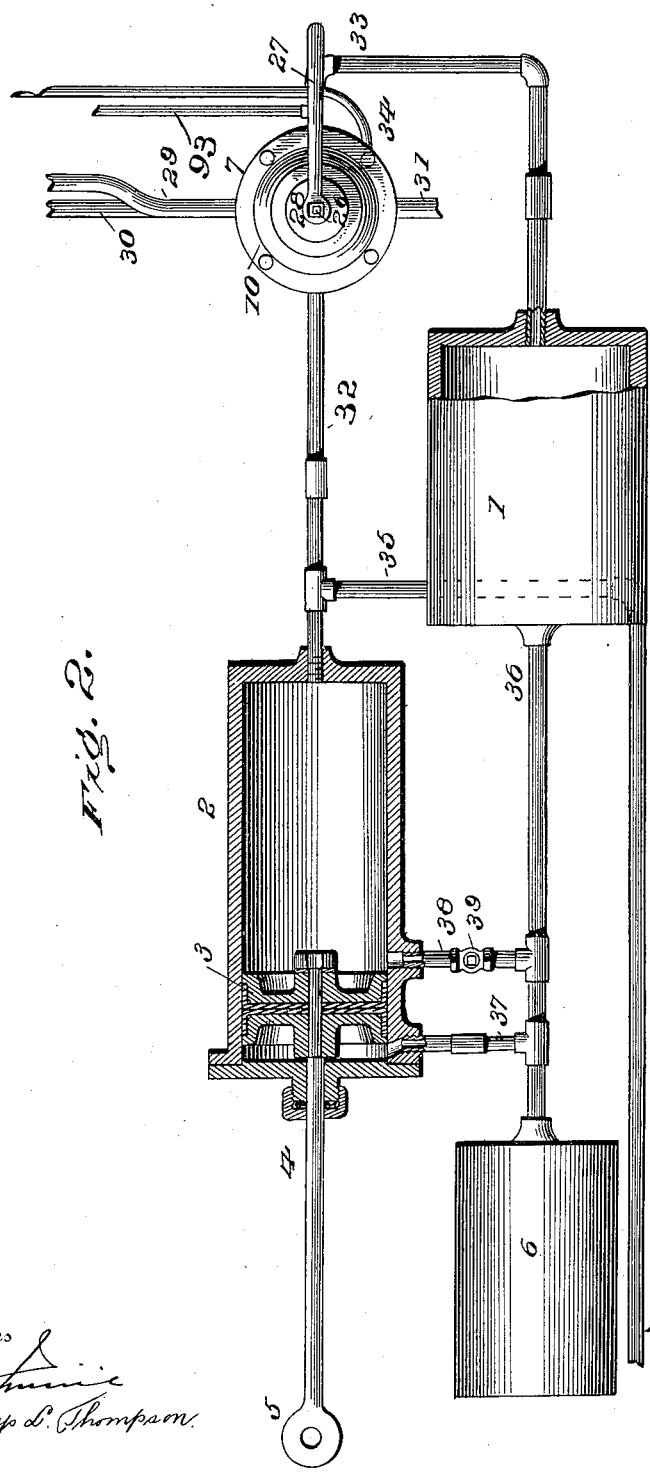

No. 629,708. Patented July 25, 1899.
E. BARTHOLOMEW.
AIR BRAKE.
(Application filed May 11, 1898.)
(No Model.) 11 Sheets—Sheet 3.
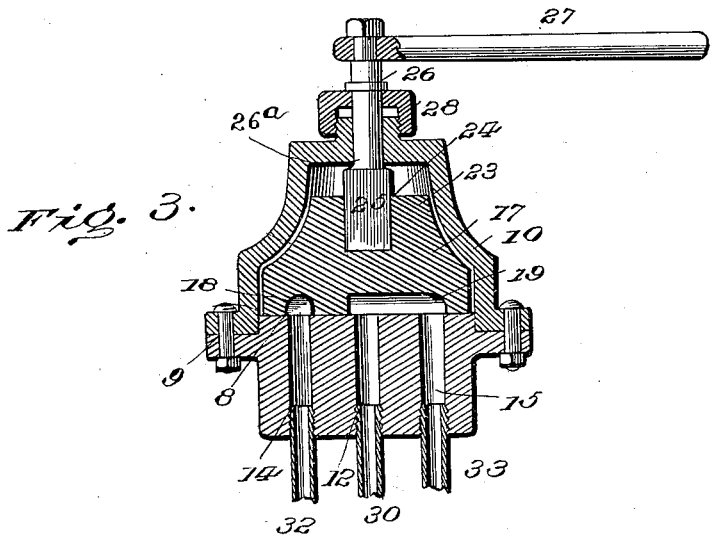
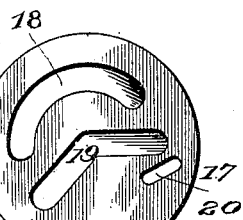
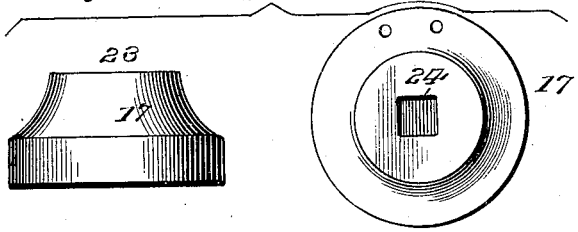
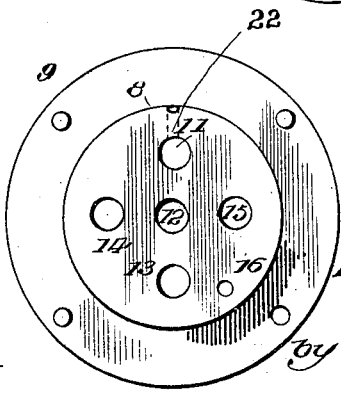
Witnesses
Gladys L. Thompson
Inventor
Ellis Bartholomew
by R.S. & A.B. Lacey, Attorneys
THE NORRIS PETERS CO., PHOTO-LITHO., WASHINGTON, D. C.

No. 629,708. Patented July 25, 1899.
E. BARTHOLOMEW.
AIR BRAKE.
(Application filed May 11, 1898.)
(No Model.) 11 Sheets—Sheet 4.
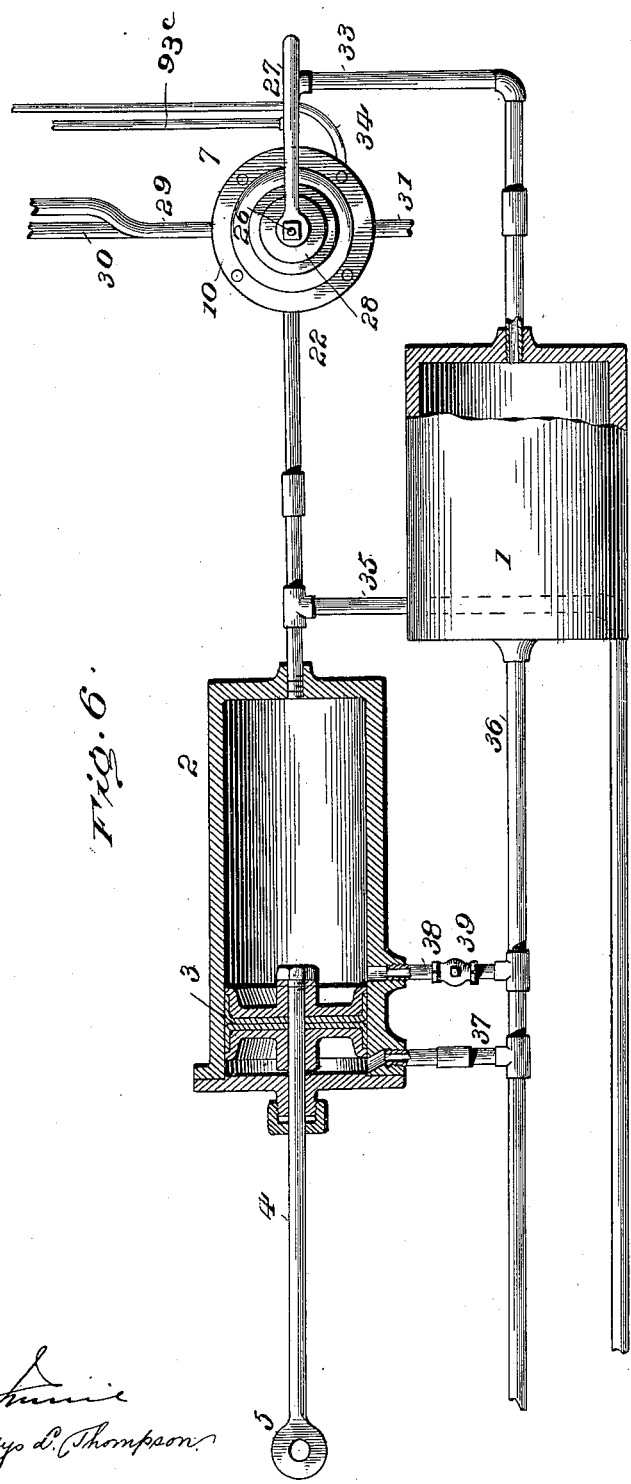

No. 629,708. Patented July 25, 1899.
E. BARTHOLOMEW.
AIR BRAKE.
(Application filed May 11, 1898.)
(No Model.) 11 Sheets—Sheet 5.

Witnesses:

Inventor
Ellis Bartholomew
by R.S.&A.B.Lacey
his Attorneys

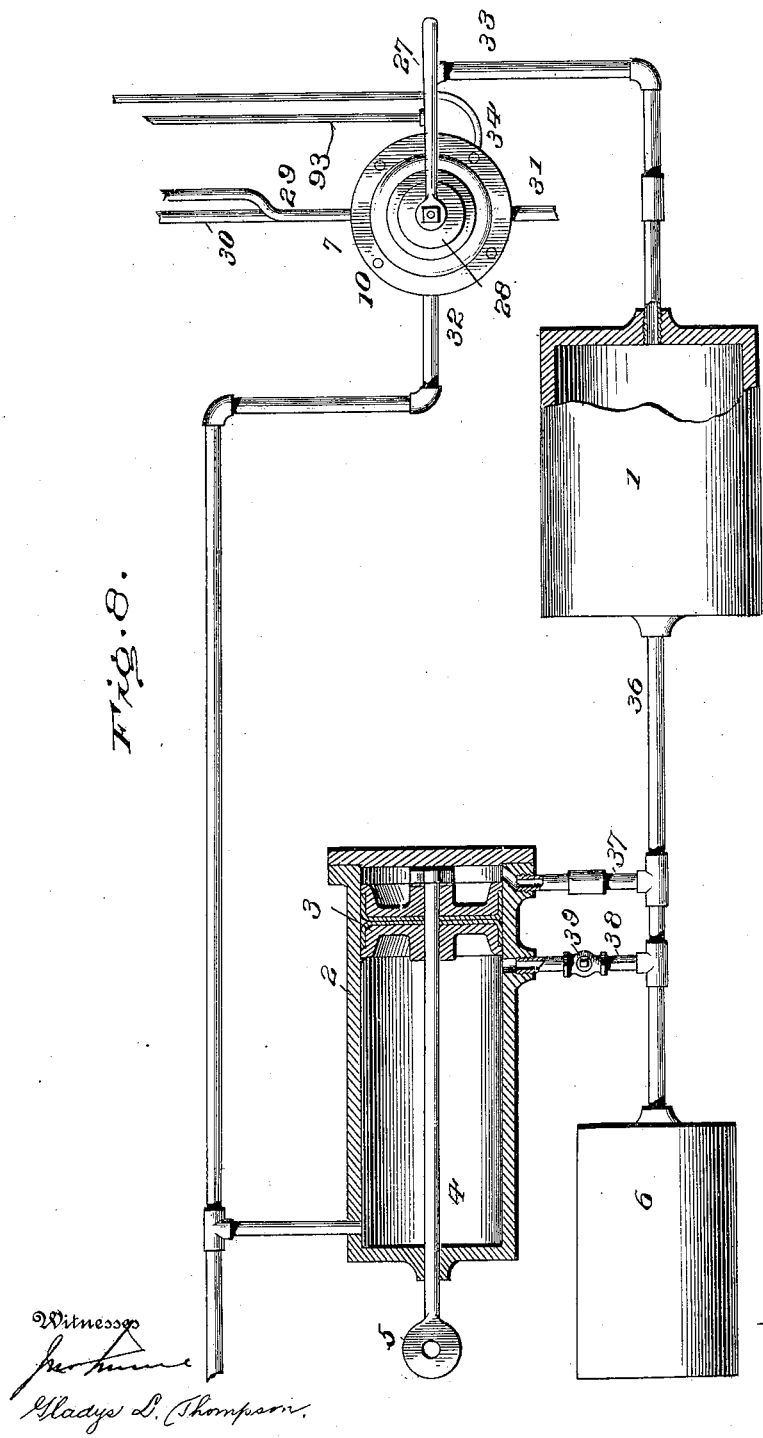

No. 629,708. Patented July 25, 1899.
E. BARTHOLOMEW.
AIR BRAKE.
(Application filed May 11, 1898.)
(No Model.) 11 Sheets—Sheet 7.
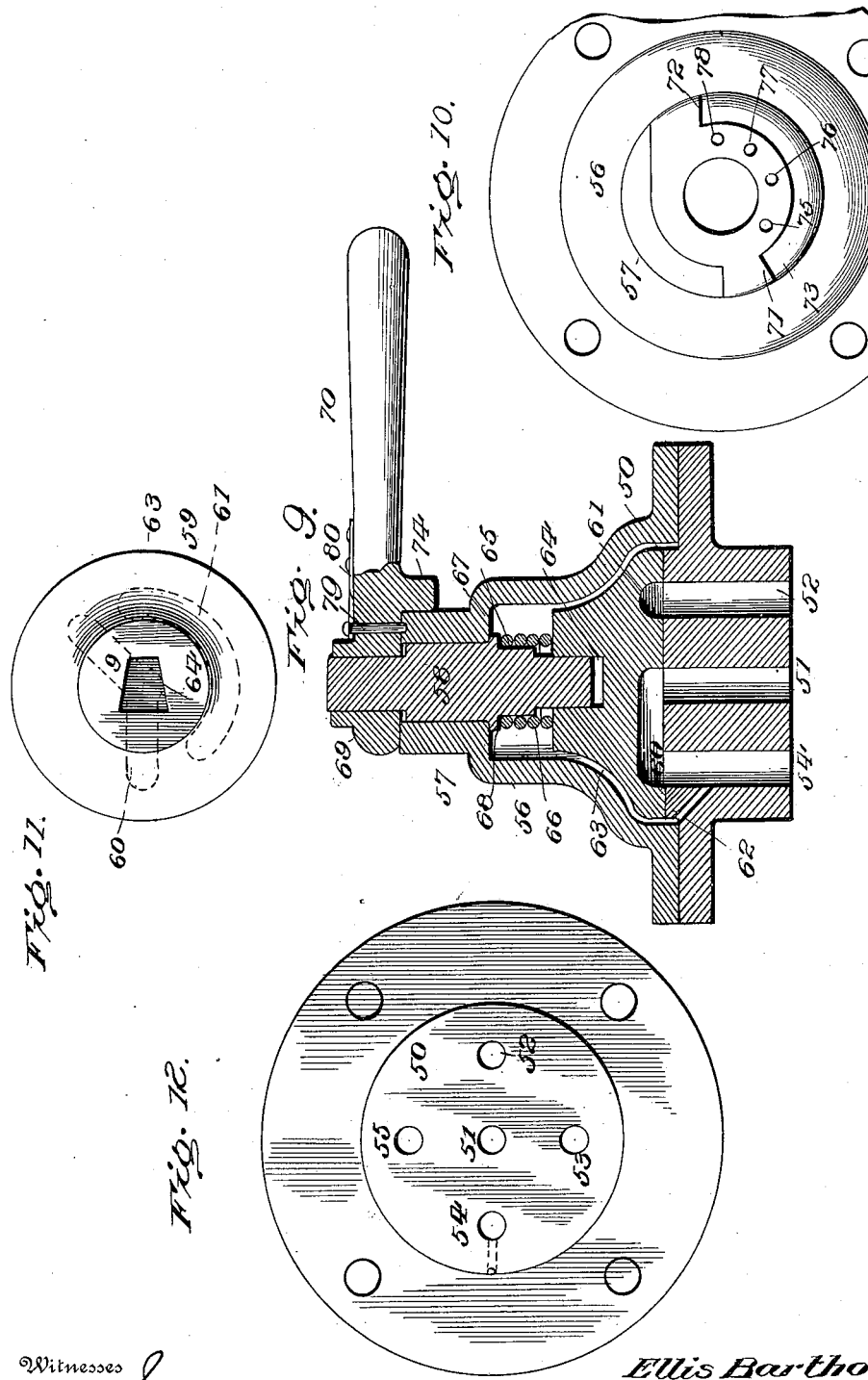
Witnesses
Inventor
Ellis Bartholomew
Gladys L. Thompson
by Lacey,
Attorneys.

No. 629,708. Patented July 25, 1899.
E. BARTHOLOMEW.
AIR BRAKE.
(Application filed May 11, 1898.)
(No Model.) 11 Sheets—Sheet 8.

Witnesses
Gladys L. Thompson.

Inventor
Ellis Bartholomew
by R. S. & A. B. Lacey,
Attorney

No. 629,708. Patented July 25, 1899.
E. BARTHOLOMEW.
AIR BRAKE.
(Application filed May 11, 1898.)
(No Model.) 11 Sheets—Sheet 9.
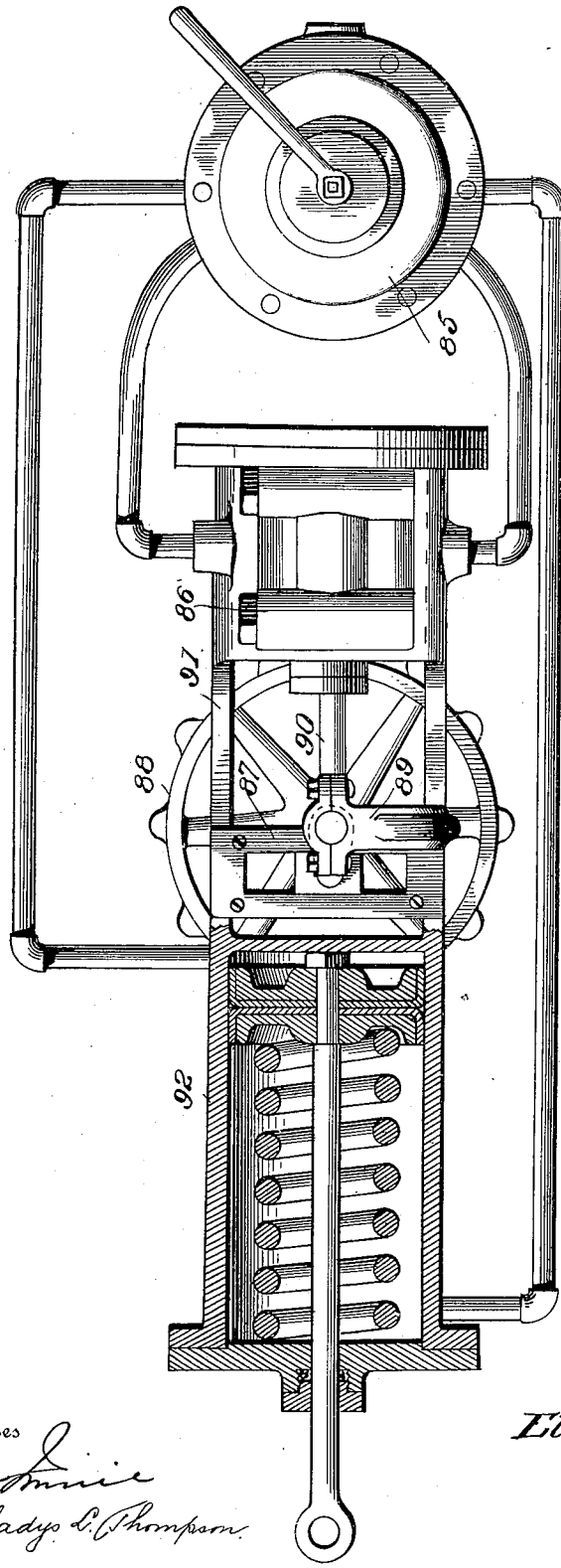
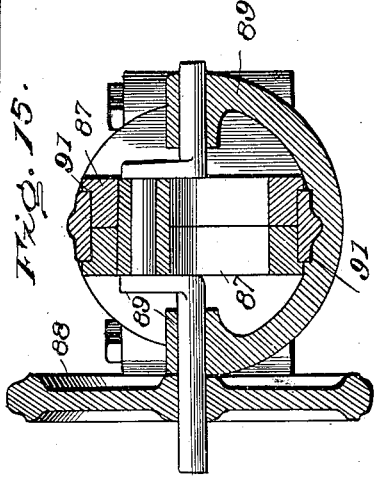
Witnesses
Inventor
Ellis Bartholomew
By R. A. B. Racey.
Attorneys

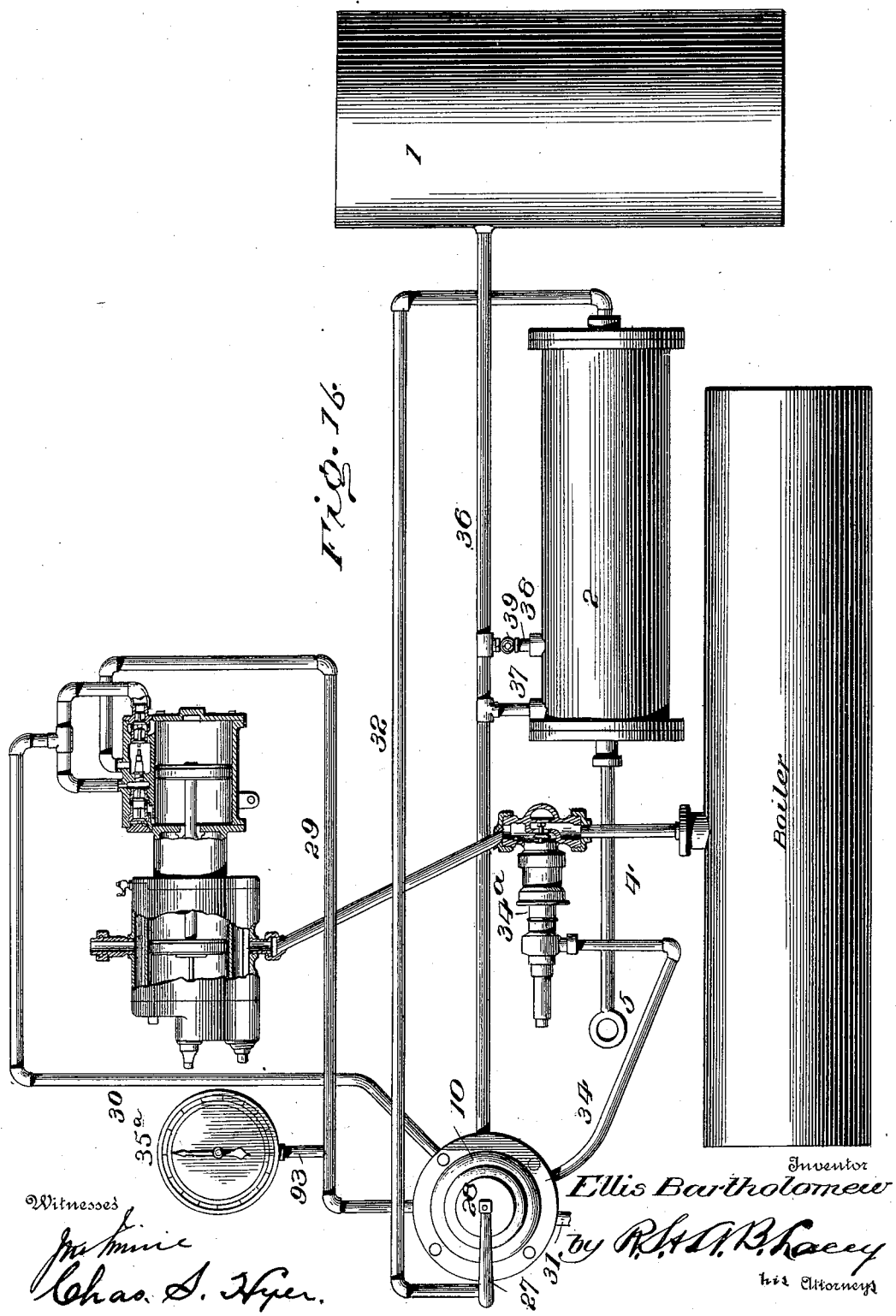

No. 629,708. Patented July 25, 1899.
E. BARTHOLOMEW.
AIR BRAKE.
(Application filed May 11, 1898.)
(No Model.) 11 Sheets—Sheet 11.

Witnesses

Inventor
Ellis Bartholomew
by R. S. & A. B. Lacey
his Attorneys

UNITED STATES PATENT OFFICE.

ELLIS BARTHOLOMEW, OF LIMA, OHIO.

AIR-BRAKE.

SPECIFICATION forming part of Letters Patent No. 629,708, dated July 25, 1899.

Application filed May 11, 1898. Serial No. 680,382. (No model.)

*To all whom it may concern:*

Be it known that I, ELLIS BARTHOLOMEW, a citizen of the United States, residing at Lima, in the county of Allen and State of Ohio, have invented certain new and useful Improvements in Air-Brakes; and I do hereby declare the following to be a full, clear, and exact description of the invention, such as will enable others skilled in the art to which it appertains to make and use the same.

This invention relates to air-brakes adapted to be applied to either steam-railroad cars or street-cars; and it consists, essentially, of a controlling-valve having a seat with separate ports serving in part as induction and also as eduction means and comprising a rotatable valve proper, with connecting cavities and ports, combined with pipes or other means of communication between the said seat and compressor or pump, together with a pipe open to the atmosphere at times and connected to a governor on the compressor or pump when used and having included therewith at least a brake-cylinder and connecting or other pipes for service or main and auxiliary reservoirs or double train-pipes without reservoirs, all of the systems having the necessary parts—viz., the controlling-valve, the compressor or pump, the governor when used, and the brake-cylinder with the connecting and service pipes, said latter parts being common to all the changes.

The invention further consists of the construction and arrangement of the several parts, which will be more fully hereinafter described and claimed.

The object of the invention is to provide means for positively applying car-brakes by air and after using the air as a brake-power retain it for subsequent use, and also employ air-pressure in connection with a vacuum as a braking force, the several parts being simplified and rendered direct in operation by a system of connections to avoid loss of power and obviate frictional obstruction.

Figure 7:
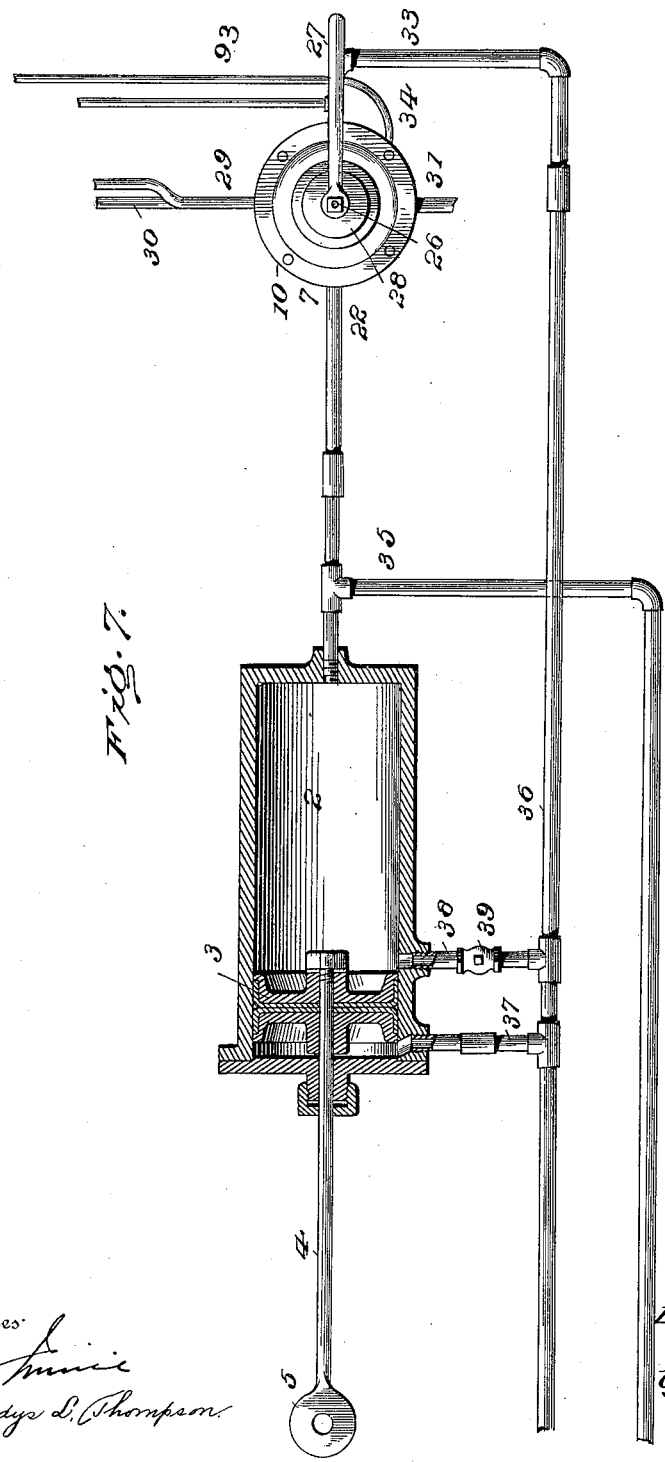
Figure 13:
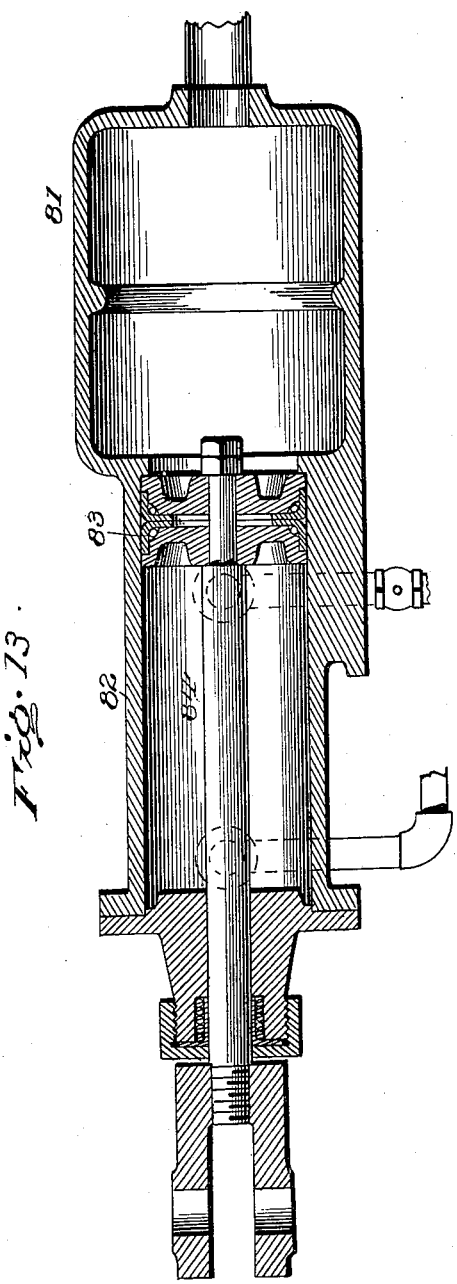

In the accompanying drawings, Figure 1 is a perspective view of the improved device, showing the inclusion of main and auxiliary reservoirs. Fig. 2 is a sectional top plan view of the same. Fig. 3 is a transverse vertical section through the valve-seat and valve. Fig. 4 is a bottom plan view of the valve proper. Fig. 5 shows detail views of parts of the valve in various positions and the operating devices therefor. Fig. 6 is a view similar to Fig. 2, showing the auxiliary reservoir dispensed with. Fig. 7 is a view similar to Fig. 6, illustrating the disuse of the main and auxiliary reservoirs and the employment of a double train-pipe. Fig. 8 is a view similar to Fig. 2, showing a modification or change in the arrangement of parts. Figs. 9, 10, 11, and 12 are detail views in plan and section of a modified form of the valve and valve-seat. Fig. 13 is a sectional view of a combined brake-cylinder and auxiliary reservoir adapted to be used in connection with the system. Fig. 14 is a sectional plan view of a further modification in the construction and arrangement of the parts. Fig. 15 is a cross-sectional view of a part of the device shown by Fig. 14. Fig. 16 is a diagrammatic view of the improved apparatus, including the compressor or pump, governor, gage, and boiler. Figs. 17, 18, 19, and 20 are detail views in plan, showing the controlling-valve arranged, respectively, for service stop, release of brakes, pumping air, and emergency stop.

Referring to the drawings, wherein similar numerals are utilized to indicate corresponding parts in the several views, the numeral 1, Figs. 1, 2, 6, and 8, designates a main reservoir, and 2 a brake-cylinder having therein a piston-head 3, with a piston-rod 4 projecting therefrom and through a suitable stuffing-box and provided on the outer end with an eye 5 for attachment to the brake-levers. In Figs. 1, 2, and 8 an auxiliary reservoir 6 is shown connected up to the other devices, and in all the forms illustrated a controlling-valve 7 is positioned at a suitable point and comprises a seat 8, with a peripheral shouldered flange 9 to receive the lower flanged end of a casing 10, which is bolted thereto. As will be hereinafter more fully indicated, the compressor or pump controlling valve and intermediate pipe connections between the said parts are necessarily included in all the forms illustrated, and the addition of other devices that will be referred to is for the purpose of accommodating various applications of the system.

Referring now more particularly to the form of the controlling-valve as shown by Figs. 3, 4, and 5, the seat 8 is constructed with an inner flat surface having six ports 11, 12, 13, 14, 15, and 16 therein at predetermined distances apart, and mounted on the said seat is a valve proper, 17, which has in the engaging face thereof a segmental curved cavity 18, an adjacent angular cavity 19, a short oblong cavity 20 at one side, and ports 21. An auxiliary port 22 extends from the port 11 in the valve-seat, as shown by Fig. 5, to a surrounding space between the casing and valve proper, which is provided by making the latter slightly smaller than the inner dimension of the casing. The valve 17 is reduced, as at 23, and has an angular recess or seat 24 therein to receive the inner angular enlarged end 25 of a valve-stem 26, which passes outwardly through the casing 10 and has an operating-lever 27 attached thereto. At the point where the stem 26 passes through the valve-casing 10 a ground-seat 26$^a$ will be formed, so that the air pressing upwardly against said stem will not leak through at this point. A stuffing-box 28 is also mounted on the top of the casing around the stem and is used to prevent a leak. The port 22, connecting with the space around the valve 17, leads from the pump-discharge and admits the air-pressure on top of the valve, so as to hold the latter to its seat and prevent the valve movements affecting such pressure. By this arrangement there is no way to exhaust the pressure off of the top of the valve. The controlling-valve may be seated at any suitable point and the valve-stem thereof lengthened or shortened to bring the operating-lever 27 within convenient reaching distance. When the improved brake is applied to an ordinary street-car, the operating-lever will be situated sufficiently near the motorman, and when the apparatus is applied to a steam-railroad car it is intended that the valve be situated in or near the cab of the engine.

Connected to the bottom of the port 11 in the seat 8 is a discharge-pipe 29 from the air compressor or pump to the said seat, and to the port 12 in the same manner a suction-pipe 30 is attached, which also leads from the said compressor or pump. A pipe 31 leads from the port 13 to the atmosphere, and with the port 14 a pipe 32 communicates and runs to one end of the brake-cylinder 2. The port 15 has a pipe 33 secured thereto, and when the main reservoir is used, as shown by Figs. 1, 2, 6, and 8, said pipe is attached to one end of said reservoir, and when the said main reservoir is dispensed with or not used, as shown in Fig. 7, the said pipe 33 is continued and becomes one of the train-pipes. The port 16 is connected by a pipe 34 to a governor 34$^a$ on the air compressor or pump, and through the ports 21 in the valve 7 the establishment of sufficient stored pressure acts on the said governor and stops the compressor or pump.

A pipe 35 connects with the pipe 32 and serves as a train-pipe, and when the main and auxiliary reservoirs are employed communication is established between them by means of a pipe 36, as will be readily understood, and where the main reservoir alone is used said pipe continues on from one car to another, or, as previously set forth, when all the reservoirs are dispensed with the said pipe forms a continuation of pipe 33 and constitutes a second train-pipe. The pipe 36 is connected with the brake-cylinder, as shown by Figs. 1 and 2, by a transverse branch pipe 37, adjacent the outer end of the brake-cylinder, and another branch pipe 38 also runs from the said pipe 36 to the brake-cylinder at a predetermined distance from the pipe 37, said latter pipe 38 having a check-valve 39 therein, which opens outwardly and is intended to relieve the brake-cylinder of air-pressure under certain conditions. These connecting branch pipes are necessary in all the forms shown irrespective of the use of any or all reservoirs.

As shown in Fig. 2, the piston-head 3 in the brake-cylinder 2 stands released and to cause the piston-head to move to the right would actuate and tighten the brake mechanism through proper connection and institute a pull on the piston-rod. When it is desired to have the piston-head work in an opposite direction to that shown in Fig. 1 and as illustrated in Fig. 8, the pipe 32 is attached to the upper portion of the left end of the brake-cylinder and the branch pipes 37 and 38 are applied to the right end of the cylinder in the same relative positions. Under this arrangement the action of the piston-head will be reversed, as will be readily understood.

Figure 17:
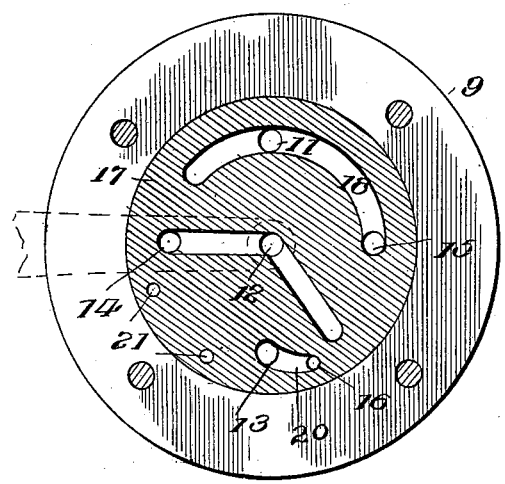
Figure 18:
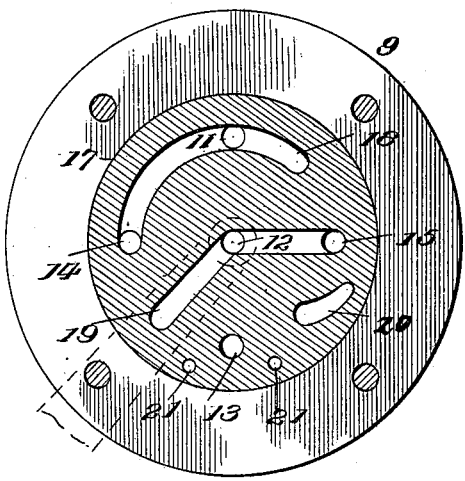
Figure 19:
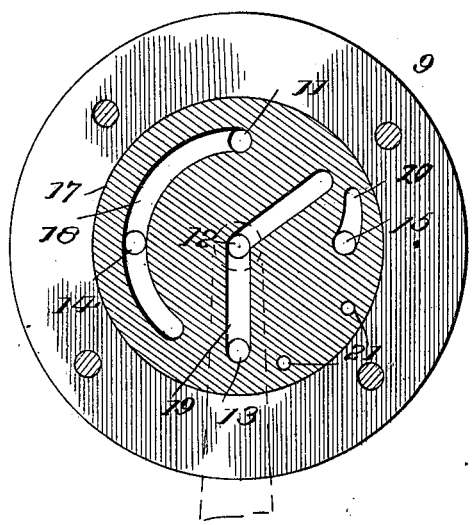
Figure 20:
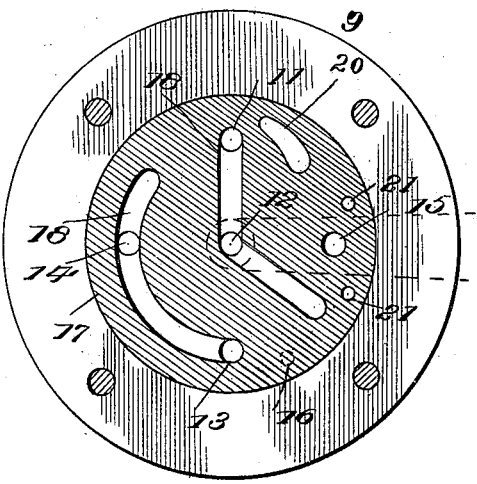

In operating the device as thus far described when in releasing position, as shown in Fig. 18, and referring only to such parts as are necessary for a practical operation, the ports 11 and 14 are connected by turning the valve 17 so as to bring the cavity 18 thereover and the cavity 19 over ports 12 and 15, and the air-compressor would be free to operate, forcing pressure through the valve into the brake-cylinder 2 and pushing the piston-head 3 forward to its extreme limit, the air-pressure under these conditions flowing or being conveyed through the connections consisting of pipes 29, 30, 32, and 33 and recirculating through the compressor or pump. To pump-pressure or the pressure between the valve and pump and in the pump-reservoir, as shown in Fig. 19, the valve 17 is moved until the ports 12 and 13 are connected by the cavity 19, and the cavity 18 is primarily made sufficiently long to maintain communication between the ports 11 and 14 at the same time that the ports 12 and 13 are connected, and consequently the circulation of air through the pipes 29 and 32 is not disturbed. When the valve 17 is placed in the position last referred to, the port 16 is connected through the pipe 34 to the governor 34$^a$, attached in turn to the air compressor or pump by means of the ports 21, as previously set forth, and when sufficient pressure is stored up to a predetermined limit, which is indicated by a suitable gage 35ª, the said governor is acted upon automatically and causes a cessation of operation of the compressor or pump. To apply the brake, the valve 17 is turned until the ports 12 and 14 are connected by the cavity 19 and the ports 11 and 15 by the cavity 18, as shown in Fig. 17. This adjustment of the valve connects the ports 13 and 16 by the cavity 20, allowing air-pressure to escape from the governor and permitting the pump to work. This arrangement of the valve causes the compressor or pump to extract all the air from behind the brake piston-head and stores it in the front end of the brake-cylinder and in the main and auxiliary reservoirs in the use of one or both of the latter. To release the brake, the valve is turned back to either of the two positions first mentioned, and the air circulation will be equalized, allowing the brake piston-head to move forward and release the brake. To make an emergency application, the valve 17 is turned, as shown in Fig. 20, until the pipe 32 is connected to the port 13 by means of the cavity 18 and connecting with port 14, allowing the air to escape from the head of the brake-piston 3 and applying the air-pressure to opposite side of the said brake-piston to force the latter to the right and apply the brake, or when an auxiliary reservoir is used the air-pressure in the latter will act in the manner stated. In light service it is not necessary to use the main or auxiliary reservoirs, as the vacuum created would be sufficient for ordinary use or low-pressure work.

When ordinary motor-cars are thus equipped and the motorman wishes to pump pressure, he watches the gage, and when a sufficient amount of pressure has been pumped he sets the controlling-valve at "release," and the said pump circulates the air that has been stored and balances the same, thereby requiring but little power to run the pump.

In Figs. 9, 10, 11, and 12 a different form of controlling-valve is shown and comprises a seat 50, having five ports 51, 52, 53, 54, and 55 formed therein, the port 51 being connected to the compressor or pump for suction purposes, the port 54 to the pipe-discharge and to the space around the valve proper, the port 53 to the brake-cylinder, the port 55 to the auxiliary reservoir and the brake-cylinder, and the port 52 to the atmosphere. It will also be understood that in this arrangement a main reservoir may be included in the several connections, or, as in the other arrangement, the main and auxiliary reservoirs may be dispensed with or only one of the same be employed. Resting on the valve-seat 50 is a casing 56, having an upper extension 57, which provides a bearing for the valve-stem 58. On the said valve-seat within the casing is mounted a valve proper, 59, having two cavities 60 and 61 therein similar to the former valve, and said seat is also provided with a port 62, which communicates with the port 54 and with the space 63 around the valve proper to at all times admit air above and about the valve to hold the latter to its seat, the communication of the said port 62 with the space 63 not being affected by the operation of said valve. The upper central portion of the valve proper, 59, is formed with a socket 64, which has the contour of a keystone to receive the lower end of the valve-stem 58, which is similarly constructed, and by this means a proper arrangement of the valve and stem is attained, as the lower end of said stem can only enter the socket in one position. The stem immediately above the valve proper is reduced, as at 65, and surrounding this reduced portion and bearing upon the top of the valve proper is a spring 66, which assists in holding said valve proper to its seat and also forces the stem 58 upwardly against an inwardly-extending portion of the casing 57, the stem having a circumferential flange 68 thereon, which bears against said inwardly-extending portion of the casing. The upper part of the stem projects above the top of the casing and is angular in contour to receive the head 69 of an operating-lever 70. The spring 66 insures an air-tight fitting of the stem with the upper portion of the casing, the latter at the top being virtually in the form of a stuffing-box, and on the exterior of the top of the casing opposite stop-shoulders 71 and 72 are formed, between which is a segmental curved way 73. The head 69 of the lever 70 has a depending lug 74, which rides over the top of the valve-casing and depends into the segmental curved way, being adapted to engage the opposite shouldered stops 71 and 72. The upper edge at one side of the top part of the casing is formed with a series of recesses 75, 76, 77, and 78 to receive the end of a removable locking-pin 79, carried by the head 69, adjacent to the lug 74, and a spring 80 is attached to the upper end of the said pin. The valve, as shown in Fig. 9, is in a position to apply an emergency, and the pin 79 is engaging the recess 78, which is clearly shown in Fig. 10. The ports 52 and 53 are connected by the cavity 61 in the valve proper, thus permitting all the air to flow forward from the end of the brake-piston through the train or service pipe and port 53, cavity 61, and port 52 to the atmosphere. When the ports 53 and 54 are connected by the cavity 61, the ports 51 and 55 are also connected by the cavity 60, the pump continues to run, the air circulating up through port 54, cavity 61, and back through port 51 to the pump. When it is desired to pump air, the lever 70 is pulled to the left until the pin 79 enters the recess 77, and to release the brake the said lever is pulled to the left until the pin enters the recess 76. In making a service stop the lever 70 is pulled to the extreme left against the shoulder 71 and until the pin 79 engages the recess 75. After applying the emergency, if it is desired to release the brake, the lever 70 is moved until the pin 79 is received by the recess 76, and under this arrangement the ports 51 and 55 will be connected by the cavity 60 and ports 54 and 53 by the cavity 61, and this will allow the pressure to flow up through the port 55 and cavity 60 to port 51 to the pump and return through the port 54 to the cavity 61, port 53, and from the latter to the brake-cylinder by train-pipe. The lever 70 is intended to be removed from the upper end of the valve-stem 58 by lifting it upwardly for the purpose of transferring it from one end of a motor-car to another in cars that are not turned, and the motorman will make this disconnection when changing ends. This valve is especially intended for motor-cars, and each end of the car will be equipped with one of the same.

The modified form of valve as shown by Figs. 9, 10, 11, and 12 is the same in every respect as the first-described valve, except the omission of ports 16 and 21' in the parts of the said first valve. The cavities 60 and 61 of the modified valve are turned over and connect the several ports 51, 52, 53, 54, and 55 in exactly the same manner as in the first valve and with the same resultant operations in view, and to describe the changes of connections between the said cavities and the several ports of the modified valve would be a duplication of the operation already set forth.

In Fig. 13 a combined brake-cylinder and auxiliary reservoir is shown. This device consists of a casing having an enlargement 81 at one end, which forms the auxiliary reservoir, and extending therefrom is a reduced chamber 82, which is employed as a brake-cylinder. In the brake-cylinder is a piston 83, to which is attached a piston-rod 84, and on the outer end of the latter is a coupling of any preferred form for connection to the brake-levers. This device is connected up similarly to the arrangement of parts shown by Fig. 8 of the drawings, and its purpose is to reduce the labor incident to setting up devices of this character, as well as the expense of time. The operation is similar to separate devices of this character, and a compact arrangement is thereby also attained.

In Fig. 14 an arrangement of parts is shown whereby a number of the pipe connections are dispensed with and several parts are cast together and have cores leading from one to the other and making the outer connections. This additional showing as combined with what has been heretofore set forth is intended to indicate that each piece may be made separate or two or more combined in one, or all may be made in one casting if found desirable and so long as the proper connections are established. The device shown by Fig. 14 is intended for use on a motor-car and comprises a controlling-valve 85 similar to either of the valves shown and connected to a pump 86 and the latter operated by a cross-head 87, in turn actuated by a sprocket or analogous gear 88, driven from the axle of a car. The cross-head 87, which is attached to the pump-piston 90, includes a crank 89, and said cross-head has a guiding-frame 91, which is attached at one end to the pump-casing and at the opposite end to a brake-cylinder 92, having the usual piston and piston-rod therein. The several parts are connected up by the pipes and provide a very compact arrangement where the main and auxiliary reservoirs are not used.

In Fig. 15 a section of the arrangement shown by Fig. 14 is illustrated and is taken immediately through the cross-head and the sprocket or other gear 88.

A train of cars connected up and equipped with the present apparatus would first have the train-line, brake-cylinder, auxiliary reservoirs and main reservoir fully charged when the latter are used. This use of parts, as will be understood, refers to steam-cars particularly, and a breakage of the line at any point between the engine or the rear car would influence the charged auxiliaries in such way as to operate the piston-head and move the brake to tighten it. It will be seen by referring to Figs. 1 and 2, or the first portion of the apparatus disclosed, that the opening in the line would be closed and the controlling-valve turned to a position connecting ports 12 and 15 and 11 and 14, which will permit the pressure from the main reservoir to flow directly through the compressor or pump, valves or pipes, to the brake-cylinder and release the brake, as hereinbefore explained.

Extending from the pipe 33 is a small branch pipe 93, which is connected with an air-gage on or near the compressor or located at such point as to be easily discernible by the motorman or engineer. The said gage, as will be understood, is to indicate the amount of air-pressure in the line or apparatus.

It is obviously apparent that changes other than those enumerated in the dimensions, proportions, and minor details of construction could be resorted to without in the least departing from the nature or spirit of the invention or sacrificing any of the advantages thereof.

Having thus described the invention, what is claimed as new is—

1. In an air-brake, the combination with a compressor having a governor connected thereto and a brake-cylinder, of a valve-seat having a plurality of ports therein, a discharge-pipe and a suction-pipe leading from the air-compressor to said seat, pipes connecting the seat and brake-cylinder, and a rotatable valve on said seat having cavities therein and adapted to establish communication between said ports.

2. In an air-brake, the combination with a compressor connected to a governor and a brake-cylinder, of a valve-seat having a plurality of ports therein, a discharge-pipe and a suction-pipe leading from the air-compressor to the said valve-seat, an atmosphere-pipe also leading from said seat, a pipe to the said governor extending from the said seat, other pipes running from said seat to the brake-cylinder and to conjointly act therewith, and a valve having cavities and ports therethrough and rotatably mounted on said seat and adapted to establish communication between the ports in the latter.

3. In an air-brake, the combination of a main reservoir, an auxiliary reservoir, a brake-cylinder, an air compressor or pump, and a controlling-valve having ports therein, two of which are connected respectively to the discharge and suction ports of the compressor or pump and the remaining ones to the main reservoir and brake-cylinder, a connection being formed between the said brake-cylinder, main and auxiliary reservoirs.

4. In an air-brake, the combination with a compressor, a brake-cylinder and intermediate devices between said parts, of a controlling-valve, a governor adapted to be operated by said controlling-valve to regulate the movement of the compressor, an atmospheric escape connection attached to said controlling-valve, a pipe between the valve and brake-cylinder, a second pipe having communication with the valve running adjacent the cylinder, and other pipes connecting opposite portions of the brake-cylinder and the said pipe adjacent the latter, one of the said other pipes having a check-valve therein.

5. In an air-brake, the combination with a compressor, a brake-cylinder and intermediate devices between said parts, of a valve including a horizontal seat with a plurality of ports therein connected to said devices and a valve proper with a horizontal engaging face having an outer regular curved cavity and an inner angular cavity entirely independent of the former cavity, said valve having control by its adjustment of a piston-head in the brake-cylinder either by direct air-pressure, vacuum force, or both, pipes being attached to opposite portions of the brake-cylinder and to a part of said intermediate devices, and one of said pipes between the brake-cylinder and a part of the intermediate devices having a check-valve therein.

6. In an air-brake, the combination of an air pump or compressor, a brake-cylinder with a piston therein, a controlling-valve having ports and cavities in opposite portions, a pipe running from one port of the valve and connected to the said cylinder, another pipe from a different port of said valve running to a point adjacent the cylinder, and a pair of pipes connected to the last-named pipe and to the cylinder, one of said pair of pipes having a check-valve therein.

In testimony whereof I affix my signature in presence of two witnesses.

ELLIS BARTHOLOMEW.

Witnesses:
D. V. HARRISON,
L. H. ROGERS.